P. MUELLER.
STRAINER FOR BIBBS.
APPLICATION FILED OCT. 29, 1919.
1,356,547.
Patented Oct. 26, 1920.
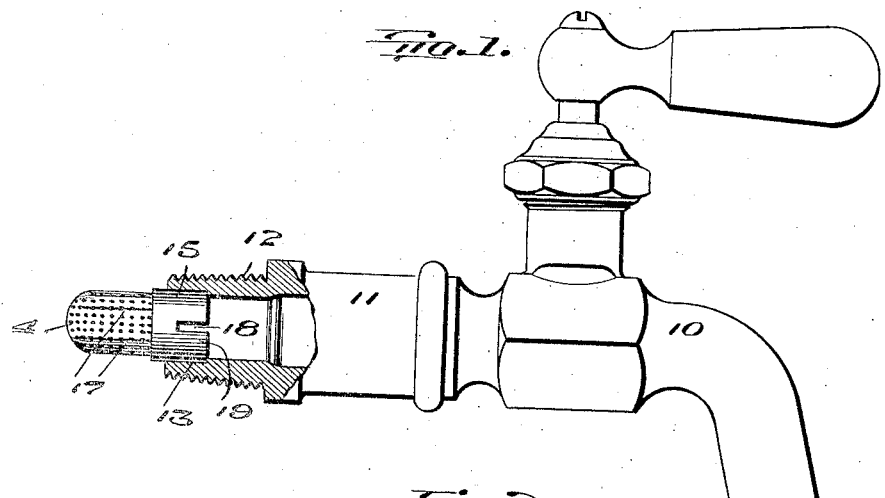
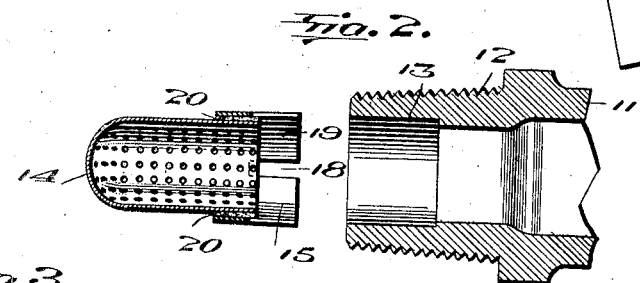
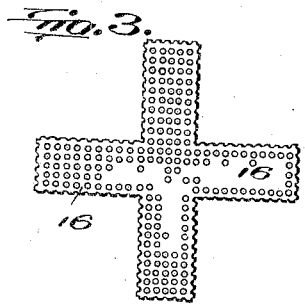
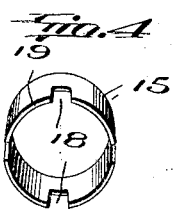
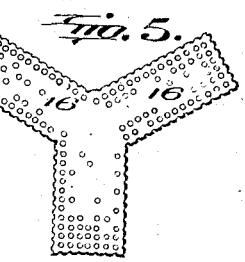
Inventor
Philip Mueller

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

STRAINER FOR BIBBS.

1,356,547.  Specification of Letters Patent.  Patented Oct. 26, 1920.

Application filed October 29, 1919. Serial No. 334,123.

*To all whom it may concern:*

Be it known that I, PHILIP MUELLER, a citizen of the United States, residing at Decatur, in the county of Macon and State of Illinois, have invented new and useful Improvements in Strainers for Bibbs, of which the following is a specification.

This invention relates to strainers, and has particular reference to strainers for use in piping systems for distributing water.

The invention has as its objects to provide an improved strainer which may be cheaply manufactured and placed upon the market at a relatively low cost to the consumer. My improved strainer is very simple in construction, and may be easily and quickly inserted in a pipe or connected to a faucet for the purpose of filtering foreign particles from the fluid passing therethrough.

The above and other objects of my invention are obtained in the structure described in the following specification and illustrated in the accompanying drawings, wherein—

Figure 1 is a side elevational view of my improved strainer shown applied to a faucet, a portion of the tail piece of the latter being broken away for illustrative purposes.

Fig. 2 is a longitudinal sectional view taken through my improved strainer and the shank portion of a faucet.

Fig. 3 illustrates one form of blank from which the reticulated or perforated portion of the strainer may be constructed.

Fig. 4 is a perspective view of the ring to which the perforated or reticulated portion of the strainer is to be secured.

Fig. 5 is a view similar to Fig. 4 which shows a slightly different form of blank.

Referring to the drawings wherein like numerals represent like parts in the several views, 10 designates a faucet which may be of any suitable construction that shown in the drawings being by way of illustration only. The body portion of the cock is provided with a tail piece 11 having a threaded shank portion 12. The shank portion of the tail piece is provided with an enlarged bore or annular recess 13 at its inner end.

My improved strainer comprises, generally, a capsule or bag-like receptacle 14, a ring or ferrule 15, and means such as solder, or the like, for securing the receptacle to the ring.

In constructing the perforated portion of my improved strainer, I cut, preferably, from a piece of perforated sheet metal a blank having a central portion, and a plurality of radially extending arms or wings. In Fig. 3, I have illustrated the blank as having four such arms or wings 16, while in Fig. 5, the blank has three, but it is to be understood that the blank may be formed of any number of radial arms, and that the blanks shown in the drawings are disclosed by way of illustration only.

In forming the perforated receptacle the arms of the blank are bent toward each other, so as to bring the opposing edges of the adjacent arms into close engagement with each other. Preferably, the receptacle is formed about a cylindrical mandrel having a rounded end, so that the receptacle is substantially cylindrical in cross-section, and close seams 17 are formed by the abutting edges of the arms 16.

The ferrule 15 comprises a metal ring, which as clearly shown in Fig. 2, tapers from one end to the other, and the end of larger diameter is provided with a plurality of longitudinally extending notches or slots 18. The portions of the ring between the notches form fingers or prongs 19 which may be flexed radially and inwardly when it is desired to insert the strainer in place. The diameter of the larger end of the ring when not under compression is to be greater than the recess 13 of the tail-piece, or the pipe to which the strainer is to be connected. I have illustrated the ring 15 as having four fingers 19, but it is to be understood that the number of fingers may be reduced or increased as desired.

The open end of the perforated receptacle 14 is adapted to be inserted into the smaller end of the ring 15, and it is secured therein by means of solder 20 as shown in Fig. 2, although it is evident that the receptacle may be secured to the ring in any suitable manner.

When inserting my improved strainer in position in the tail piece of the bibb, the fingers 19 are pressed radially inward, and then inserted into the bore or recess 13 of the tail-piece. When external pressure upon the fingers 19 is released, the fingers will flex or spring outwardly and bear frictionally against the walls of the recess 13 so that accidental displacement of the strainer is protected against. The edge of the ring is adapted to engage against the shoulder provided at the inner end of the enlarged bore 13 so that water pressure behind the strainer will not carry the strainer along in the pipe.

It is to be understood that although I have shown my improved strainer applied to a bibb, it may be inserted anywhere in a system of pipes, and while it is preferable to provide the pipe or faucet to which it is connected with a recess similar to that designated by the numeral 13, this recess is not absolutely necessary.

I may, if desired, omit the ring 15, since, after the arms 16 are folded so that their edges are brought into contact with each other, the tendency of the resilient arms 16 to spring outwardly provides the requisite friction to maintain the screen in place within the annular recess 13.

It is to be understood that my invention is susceptible of various changes and modifications which would be within the spirit of the invention without departing from the scope of the following claims.

What I claim is:

1. A strainer comprising a perforated portion formed from a blank having a plurality of arms bent to bring their adjacent edges into contact with each other, and means for fastening the bent arms.

2. A strainer comprising a perforated receptacle composed of an end portion and a plurality of arms having their adjacent edges abutting each other, and a ring to which said arms are secured.

3. A strainer comprising a perforated receptacle composed of an end portion and a plurality of arms, said arms being connected to said end portion and having their adjacent edges abutting to form close seams, and a ring adapted to encircle the free ends of said arms.

4. A strainer comprising a perforated receptacle composed of a semi-spherical end portion, and a plurality of arms bent transversely in the form of an arc, said arms being connected to said end portion and having their adjacent edges abutting to form close seams, and a ring adapted to encircle the free ends of said arms.

5. A strainer comprising a perforated receptacle composed of an end portion and a plurality of arms with their adjacent edges abutting, a ring encircling the free ends of said arms, and means for securing the ring to said receptacle.

6. A strainer comprising a perforated receptacle, and a ring to which said receptacle is connected, said ring tapering from one end to the other and having its larger end provided with a plurality of prongs or fingers adapted to be flexed inwardly to permit the strainer to be connected to a pipe or the like.

7. A strainer comprising a perforated receptacle composed of an end portion and a plurality of arms, said arms being connected to said end portion and having their adjacent edges abutting to form close seams, and a ring tapering from one end to the other, said arms being adapted to be inserted into the smaller end of said ring, and the larger end of said ring being slotted to provide a plurality of fingers adapted to be flexed inwardly when inserting the strainer in a pipe or the like.

8. In a combination; a faucet having an enlarged bore; and a strainer comprising a perforated receptacle and a ring to which the receptacle is connected, said ring being tapered from one end to the other and the larger end being slotted to provide fingers which must be flexed inwardly to permit insertion of the ring into said bore of the faucet.

9. A strainer formed from a blank having a plurality of arms, said arms being bent to bring their adjacent edges into contact with each other.

In testimony whereof I have hereunto set my hand.

PHILIP MUELLER.